United States Patent [19]

Romberg et al.

[11] Patent Number: 4,808,453

[45] Date of Patent: Feb. 28, 1989

[54] PHARMACEUTICAL ELASTOMERIC COATING

[76] Inventors: Val. G. Romberg, 7930 Beverly Blvd., Upper Darby, Pa. 19082; Patty H. Kiang, 3563 Arcola Rd., Collegeville, Pa. 19426; Wayne T. Curry, 1035 Belleview Ave., Pottstown, Pa. 19464

[21] Appl. No.: 37,959

[22] Filed: Apr. 13, 1987

[51] Int. Cl.4 .............................................. B27N 5/02
[52] U.S. Cl. .................................. 428/36.8; 215/364; 220/DIG. 19; 428/494; 428/495; 428/519; 428/521; 528/396
[58] Field of Search ................. 428/494, 519, 35, 495, 428/521; 528/396; 220/19, DIG. 19; 215/364

[56] References Cited

U.S. PATENT DOCUMENTS

| 3,288,728 | 11/1966 | Gorham et al. | 528/125 |
| 3,300,332 | 2/1966 | Gorham et al. | 428/403 |
| 3,342,754 | 9/1967 | Gorham et al. | 428/195 |
| 3,927,695 | 12/1975 | Crockwell | 138/137 |
| 4,082,862 | 4/1978 | Esemplare et al. | 428/494 |

Primary Examiner—George F. Lesmes
Assistant Examiner—James B. Monroe
Attorney, Agent, or Firm—Eugene E. Renz, Jr.

[57] ABSTRACT

A closure for use with a container with pharmaceutically pure contents therein. The elastomeric closure has an elastomeric base and a continuous polyparaxylylene coating on the base. The coating ranges from about 0.5 microns to about 2.0 microns in thickness. The closure member has a coefficient of friction of less than 1.0 and is capable of substantially preventing metal extraction from said elastomers.

6 Claims, No Drawings

PHARMACEUTICAL ELASTOMERIC COATING

FIELD OF THE INVENTION

This invention relates to pharmaceutical products which comprise a container having pharmaceutically pure contents contained in the container and an elastomeric closure member which closes the container. The elastomeric closure has an elastomeric base and a continuous poly (p-xylylene) coating of from about 0.5 microns to 2 microns in thickness.

BACKGROUND OF THE INVENTION

For many years, the most successful closure system for pharmaceutical products has been the use of elastomeric stoppers in glass or plastic vials. The glass and rubber combination has been useful for a wide variety of pharmaceutical ingredients combining both safe storage of the medicine and easy access through the rubber stopper. Particuarly, when liquids are contained in the vial, a needle can easily penetrate the rubber stopper to withdraw the desired amount of ingredient without otherwise interfering with the integrity of the closure. Even when powders are stored in such containers, the elastomeric closure can be penetrated with a needle to activate the powder by adding liquid such as pure water. The activated medicine remains in a safe, protected environment.

Because of the success of these types of pharmaceutical devices, and as more and more systems have been using rubber stoppers in glass containers, the rate at which these devices can be manufactured contributes greatly to the economic efficiencies of this otherwise desirable component design. For example, conventional pharmaceutical devices which are useful for filling vials rely on a mechanical implantation of the rubber stopper into the neck of the vial or other shaped container. Just prior to the mechanical insertion, the rubber stoppers are transported from a hopper to the stoppering equipment, usually be centrifugal, vibrating or gravity feed. It is essential that the rubber components not hang up on each other or on the transfer equipment. It is essential that they flow smoothly into the capping or closure-forming device. The equipment, particularly that for transferring components, is normally made from stainless steel or other materials which can be kept extremely clean for pharmaceutical purposes. The ability of the rubber component to slide smoothly on the surface is directly dependent upon its coefficient of friction, with the lower values for coefficient of friction being far more desirable. Also, it is important that the elastomeric components do not stick to one another during travel through the transfer equipment.

In the prior art, the high coefficient of friction of rubber stoppers and other rubber materials which are being fed to closure devices and other pharmaceutical devices has been the limiting factor in the speed of the machine. Whether gravity or centrifugal force or vibration feeding devices are used, they require that the rubber stoppers or other elastomeric components move smoothly over the surface of the feeding unit as rapidly as possible. Typically, rubber devices of the type used in pharmaceutical closures have coefficients of friction of at least 1.2. This clearly acts as an impediment to rapid movement and, therefore, efficient and low cost production.

One solution which has been proposed to improve the general processibility of rubber closures and which has at least kept the individual rubber stoppers from binding to one another during autoclaving and other treating steps, is the use of silicone oil as a coating on the outside of the stoppers. Silicone oil has improved the lubricity of the rubber closures but has also added additional problems. The use of silicone oil increases the particle cout found during the inspection of various drug solutions. The Food and Drug Administration evaluates processes by counting the number of particles present, without concern for the source or nature of the particles. Silicone oil in small amounts, is normally not an undesirable contaminant in medicine but its use still adds to the count of particles and, therefore, detracts from the overall acceptance of its use in processing equipment. While the amount of silicone oil is minimal, being only that amount necessary to prevent the individual stoppers from sticking to one another, silicone oil is not able to adequately lower the coefficient of friction of rubber stoppers for use in high speed capping equipment so as to give uniform, faster movement, particularly with centrifugal feeding systems. Finally, the rubber stoppers which have been treated by the use of silicone oil are not any more effective in surviving chemical tests concerning the compatibility with and contamination of material contained in the vials.

The elastomeric materials which are used in the pharmaceutical industry are carefully selected and formulated to be as inert as possible when in contact with pharmaceutical products such as medicines and the like. Formulations and products are checked constantly to determine that they are not being contaminated. Of particular importance in addition to the above-mentioned particle count produced by silicone oil are particles which come off of the elastomeric closure itself. Additionally, certain trace metals are employed in the manufacture of elastomeric compounds in many instances, and it is essential that these materials not be extracted to any significant extent by the medicines or other pharmaceutical fluids which are in contact with the elastomeric products. Of particular concern are metals such as calcium, aluminum and heavy metals such as zinc and lead. Accelerated and ultra-vigorous tests are used to determine the amount of these undesirable materials which potentially may be extracted from elastomeric materials. The quantity of extractable metals produced when products are subjected to vigorous testing is beyond the level produced under normal conditions the medicine would be free from likely contamination.

At the present time, pharmaceutical products have not been manufactured using a container having pharmaceutically pure contents therein and an elastomeric closure member closing said container, wherein the elastomeric closure member has an elastomeric base and a coating over the elastomeric base which substantially improves the coefficient of friction and significantly reduces the amount of extractable metal ions which are potentially extractable from the elastomeric closure member. A variety of materials have been proposed as coating materials for a variety of other purposes generally. However, coating the entire surface of elastomeric closure members such as rubber stoppers for use with containers having pharmaceutically pure contents therein has not become an accepted practice in the pharmaceutical industry wherein the above objects would be satisfied.

One material which has been found to be extremely useful as a coating material generally are the polymers of the various paraxylylenes. Gorham U.S. Pat. No. 3,288,728 discloses a basic method of preparing linear copolymers from paraxylylenes using temperature conditions between 450° C. and 700° C. This patent suggests that small articles can be protected or encapsulated with these polymers to obtain the insulative and protective properties of the polyparaxylylenes. The reference generally suggests that there are enumerable possible applications for the polymer as a coating material.

Gorham U.S. Pat. No. 3,342,754 describes the broad method of preparing linear polymers of paraxylylene and particularly in preparing coatings using that material. The patent is replete with a variety of examples of variations and suggests that these polymers are desirable for use as film, fiber, surface coating, or electrical insulation. Both this patent and the previous Gorham patent, offers the general suggestion that almost any material may be coated with the paraxylylene polymers, although neither has a specific example relating to the pharmaceutical industry.

Tittman et al U.S. Pat. No. 3,379,803 described particular apparatus and methods useful for polymerizing paraxylylene. General disclosures using this material indicating that a thin, yet continuous, film may be prepared on a wide variety of substrates. Tittman et al's related U.S. Pat. No. 3,472,795 describes an additional method for increasing the coating thickness.

Parent U.S. Pat. No. 4,225,647 discloses a process for coating an extremely broad list of materials with polymers of paraxylylene. The coating of articles may range from less than 50 Angstroms to as thick as 5 mils or more. The Parent patent suggests that a first layer of substituted silicon compounds be employed prior to the polyparaxylylene coating.

Finally, Gorham et al U.S. Pat. No. 3,300,332 describes a coating process wherein the object is to coat with an insoluble coating. The thickness of the coating is not described in detail but Gorham suggests that the thickness of the polymeric coating is not narrowly critical but is dictated by the end use of the product. He describes a coating of 0.1 mil as being very thin and useful when desiring resistance to solvent or reactive attack. In one Example, six rubber stoppers are coated to protect them from swelling from solvents such as heptane. The amount of coating added ranges from 0.22 to 0.28 grams, indicating a thickness of at least 1 mil. There is, of course, no indication that the coefficient of friction or the resistance to extraction by various means of metals could be accomplished so as to provide a superior product for use with pharmaceuticals.

SUMMARY OF THE INVENTION

Accordingly, it has now been discovered that an improved pharmaceutical product may be prepared for use in the following manner. The product comprises a container with a pharmaceutically pure contents therein and an elastomeric closure member closing said container. The elastomeric closure member has an elastomeric base and a continuous polyparaxylylene coating of from about 0.5 microns to about 2 microns on the elastomeric closure. The coating is sufficient to reduce the coefficient of friction of the closure member to less than 1.0 and preferably less than about 0.5. The coating is also sufficient to substantially prevent metal ion extraction from the elastomer. Particularly, the coating acts to prevent metal ion extraction so that from 50 to 1000 fold less metal ions are extracted in one hour when autoclaving in 1 molar hydrochloric acid. Also, substantial reduction or elimination or organic extractables is achieved by the use of the present invention.

It has been found that the narrow range of about 0.5 microns to about 2.0 microns is particularly suited for preparation of coatings on elastomeric closure members. The coating substantially improves the economics of manufacturing pharmaceutical products because of the significant improvement in coefficient of friction, thereby allowing the production of finished products at much higher rates. At the same time, the amount of coating employed is significantly less than what one would expect in accomplishing the barrier properties which are necessary for this purpose, thereby significantly reducing the cost contribution of the polyparaxylylene which is employed.

DETAILED DESCRIPTION OF THE PREFERRED EMBODIMENT

The devices of this invention may be manufactured from any conventional elastomeric base material which has been used in pharmaceutical devices where an elastomeric component is required. Such materials are formed into rubber stoppers, plunger tips, pre-filled syringes, washers, and other elastomeric closure members which are in contact with the contents of a container in which there is a pharmaceutically pure material.

The combination of an elastomeric closure with the polyparaxylylene coating should be sufficient to reduce the coefficient of friction to less than 1.0 and preferably to about 0.5 or less so that high-speed capping and filling equipment may be used to give uniform and rapid movement of the materials, particularly when a centrifugal feed is employed. This coating allows for the elimination of silicone oil in processing, thereby substantially reducing the particles which may be found in the solution which ultimately comes in contact with the elastomeric closure.

The elastomeric component of the pharmaceutical devices described herein may be manufactured from many of the elastomeric compounds which have conventionally been used in the pharmaceutical industry. Natural rubber, of course, was the original choice of materials for many elastomeric formulations and components in the pharmaceutical industry. Butyl rubber and many of the synthetic elastomers have been successfully used as stoppers, plunger tips, and the like, depending upon the requirements for stability during autoclaving or sterilization. A particular rubber which is admirably suited for the purposes of this invention is butyl rubber.

The present invention is intended to be used on all of the conventional preexisting stoppers and other elastomeric articles which are available in the pharmaceutical industry. Accordingly, any elastomeric base which has been used or which would be unsable if the coefficient of friction and barrier to metal extraction was adequate, is therefore, contemplated for use as the first component of the present invention.

Presently available rubber products are admirably suited for their purpose in the pharmaceutical industry, except for the delay caused in high-speed machines and the potential for extraction of metal ions. Accordingly, the present invention seeks to improve the stopper's functionality in these areas while maintaining its functionality in all of the remaining areas. Specifically, the invention contemplates improving the coefficient of friction of the closure member for use in high-speed capping equipment, particularly with centrifugal feeds. It also contemplates the elimination of silicone oil and other processing aids. Finally, the invention contemplates the significant improvement in resisting extraction of metal ions from rubber products which are otherwise admirably suited for use in the pharmaceutical industry. Also, some elastomers contain organic extractables. The effectiveness of the rubber materials as a barrier and as a stopper and as a product resistant to chemical attack is intended to be maintained when this second component is applied. Because elastomeric closures currently in use are admirably suited except for the above-mentioned deficiencies, there is no significant reason for improving any of these other properties. Nonetheless, it is necessary to maintain these properties when applying the coating as described hereinafter.

Polymers made from the various paraxylylenes may be applied as a coating in the manner which has been described previously in the various patents discussed hereinabove. Specifically, as an example of various paraxylylene polymers and paraxylylene copolymers, the previously referenced Gorham U.S. Pat. Nos. 3,342,754 and 3,288,728 describe the chemistry of the polymers and copolymers which may be employed as coatings in the present invention. The Titman et al U.S. Pat. Nos. 3,379,803 and 3,472,795 describe suitable methods for applying these particular polymers and copolymers onto a wide variety of materials. It has been found that these processes generally are suitable for applying polymers and copolymers of paraxylylene to the elastomeric base materials contemplated in the present invention. The term polyparaxylylene is intended to include both polymers and copolymers of the various paraxylylenes which are described in the prior art.

As has been stated above, the coatings applied to the elastomeric base members of the present invention produces a product which has a superior coefficient of friction. For the purposes of this invention, the coefficient of friction is defined as follows: The coefficient of friction is the ratio of frictional forces resisting movement of the surfaces being tested to the force applied normal to the surface. In this case, the surface used was a stainless steel plate. Rubber stoppers were fixtured in a 256 gram weight such that all of them lie on the stainless steel plane. The incline of the plane was then increased until the weight commenced to slide, at which point the plane was locked and the angle was noted. The tangent of the angle is the static coefficient of friction.

It has been found that the paraxylylene polymer coatings on elastomeric bases improves the coefficient of friction fromm in excess of 1.5 to less than 1.0 and oftentimes to less than about 0.5.

In order to demonstrate the efficacy of the present invention, the following experiments were performed. In each case, the conventional rubber stopper used in the variety of applications in the pharmaceutical industry was employed. A particular elastomer was a butyl rubber and is generally known in the trade as a 4416/50 gray S-127 pharmaceutical stopper. The rubber stoppers were coated with polychloroparaxylylene in the manner described above, at a thickness ranging from less than 0.5 microns to more than 2.0 microns. The results in each case represent an average of a number of stoppers.

Presented below in Table I are the results of various tests for coefficient of friction measured as described above.

TABLE I

| Coefficient of Friction Measurement | |
|---|---|
| Elastomeric closure member | Coefficient of friction (tangent of the angle of slide) |
| Uncoated | 1.7 |
| Silicone coated | 1.0 |
| 0.1 microns polychloroparaxylylene | 1.0 |
| 0.5 microns polychloroparaxylylene | 0.5 |
| 1.0 microns polychloroparaxylylene | 0.18 |
| 2.0 microns polychloroparaxylylene | 0.10 |

Another series of experiments were performed to compare uncoated rubber stoppers of the type described above with those coated with a polyparaxylylene coating of a thickness of 1.0 microns. The tests performed were the standard U.S. Pharmacopic-National Formulary Testing and the results are presented below in Table II.

TABLE II

| Standard USP-NF Testing | | |
|---|---|---|
| Test | Uncoated | 1.0 micron coating of polychloroparaxylylene |
| pH shift | −0.8 | −0.4 |
| Nephelos (turbidity) | 12 | 1 |
| Reducing substances (MLS-$I_2$) | 0.0 | 0.0 |
| Total solids (MGS) | 1.2 | 0.4 |
| UV | No absorbence | No absorbence |

As can be seen from a comparison of the data in Table II, the elastomeric closure in combination with the polyparaxylylene coating is substantially superior to the uncoated rubber product. All of the values for the uncoated material are acceptable by pharmaceutical industry standards, but the improved results demonstrate that the present invention does not adversely affect the acceptability of the product, but rather enhances the acceptability.

In order to measure the potential for extraction of metals, a quantity of 4416 gray rubber stoppers were autoclaved at 120° C. in 100 ml of 1 molar hydrochloric acid for 1 hour. The acid was then analyzed by atomic absorption analysis for both a zinc and aluminum concentration. Presented below in Table III are the results of uncoated rubber stoppers and rubber stoppers coated with 2 microns of polychloroparaxylylene. The improvement ranges from 35 to nearly 1000 fold improvement.

TABLE III

| Extractable Metal | Uncoated | Coated (2 microns) |
|---|---|---|
| Aluminum (ppm) | 7.0 | 0.2 |
| Zinc (ppm) | 94.0 | 0.1 |

Other tests to determine the effect of coating thickness on extractable metals of a different rubber, 817 gray, were performed and the results are shown below in Table IV. In this series of tests, stoppers were autoclaved for 1 hour in 1 molar hydrochloric acid and the acids were then analyzed by atomic absorption analysis for the various metals. Again, it will be noted the surprising results attained by the present invention.

TABLE IV
Thickness Effect of Extractable Metals on 817 Gray Rubber

| Coating Thickness (microns) | Calcium (ppm) | Aluminum (ppm) | Zinc (ppm) |
|---|---|---|---|
| 0.0 | 0.17 | 4.2 | 50 |
| 0.1 | 0.15 | 1.8 | 35 |
| 0.5 | 0.03 | 0.1 | 12 |
| 1.0 | <0.002 | <0.05 | 0.2 |
| 2.0 | <0.002 | <0.05 | <0.05 |

Even though the prior art indicates coatings generally are possible at thicknesses less than 0.1 microns or lower, the surprising effectiveness of the narrow range of this invention dramatically demonstrates the superiority of this coated elastomer in a pharmaceutically critical environment, wherein an improvement of from 50 to 1000 is observed.

The effect of the polyparaxylylene coating on various rubber stoppers was also measured for other properties which pharmaceutical products are required to have. In one series of tests, coring was measured using a 20 gauge reusable needle with 10 punctures in each stopper. A new needle was used for each 40 punctures. The contents of the vials were then examined on a black filter and no coating flakes were found. Stoppers coated and uncoated were then autoclaved at 121° C. for 1 hour in steam and water. The uncoated stoppers were tacky and stuck together in each case. Coated stoppers were free flowing and non-tacky and no damage to the coating was observed.

Coated and uncoated stoppers were tested for needle penetration using double-ended 21 gauge disposable needles. A penetration speed of 5 in/min was used. The force required for both coated and uncoated rubber stoppers was substantially the same in both cases.

Tests were also performed which demonstrates that the amount of extractable organic was very substantially reduced, if not eliminated.

One test used to determine the amount of particulates clearly demonstrates the improved results that polyparaxylylene coatings on stoppers provide when compared to the stoppers which have been treated with silicone to increase the flowability of the products through a centrifugal feeding apparatus during the closure step. Coated, uncoated and silicone treated stoppers were placed in 150 ml of filtered deionized water. These were then mixed for 30 minutes and the particles in a 10 ml sample were counted. Particles greater than or equal to 5 microns were counted and calculated. Both coated and uncoated stoppers had less than 300 particles per stopper, while those which were treated with silicone had in excess of 10,000 particles per stopper.

Finally, a variety of coatings were applied to rubber stoppers for evaluation during the manufacture of pharmaceutical closures. Specifically, pharmaceutical products which have a container with pharmaceutically pure contents were closed with an elastomeric closure member of the type described herein. These closures included an elastomeric closure having an elastomeric base and a continuous polyparaxylylene coating ranging from about 0.5 microns to about 2.0 microns. The stoppers were first autoclave sterilized at 135° for 12 minutes. They were then loaded into a stoppering machine. These stoppers were unusable in some cases because the autoclaving step caused the stoppers to stick together, causing shutdown of the machine. Next, the products prepared according to the present invention were loaded into the stoppering machine after autoclaving as described above. The maximum speed of the stoppering machine was excellent and successful production was achieved without silicone oil, demonstrating the substantial economies which are achieved using the present invention.

A variety of pharmaceutical products may be used in the container having the closure of this invention. Specifically, pharmaceutical products containing medical and veterinary drugs, distilled water, solvents containing medicines, syrups, serums and the like are unaffected when packaged with elastomeric closures according to the present invention.

What is claimed is:

1. An elastomeric stopper for use with a container with pharmaceutically pure contents therein comprising an elastomeric base and a continuous polyparaxylylene coating on said base to reduce the coefficient of friction of said stopper to less than 1.0 and substantially prevent metal ion extractions from said base, said coating ranging from about 0.5 microns to about 2.0 microns in thickness.

2. The product of claim 1, wherein said coefficient of friction is less than 0.5.

3. The product of claim 1, wherein said extraction is at least 50 fold less calcium ion at 1 hour of autoclaving in 1 molar hydrochloric acid than an uncoated stopper.

4. The product of claim 1, wherein said extraction is at least 50 fold less aluminum ion in 1 hour of autoclaving in 1 molar hydrochloric acid than an uncoated stopper.

5. The product of claim 1, wherein said extraction is at least 50 fold less zinc ion at 1 hour autoclaving in 1 molar hydrochloric acid than an uncoated stopper.

6. The product of claim 1, which further includes a container with pharmaceutically pure contents therein.

* * * * *

UNITED STATES PATENT AND TRADEMARK OFFICE
CERTIFICATE OF CORRECTION

PATENT NO. : 4,808,453

DATED : February, 28, 1989

INVENTOR(S) : Romberg et al

It is certified that error appears in the above-identified patent and that said Letters Patent is hereby corrected as shown below:

On the title page:

The Assignee should read as follows:

Assignee: The West Company, Incorporated,
Phoenixville, Pennsylvania

Signed and Sealed this

Eleventh Day of December, 1990

*Attest:*

HARRY F. MANBECK, JR.

*Attesting Officer*        *Commissioner of Patents and Trademarks*